Patented Nov. 4, 1952

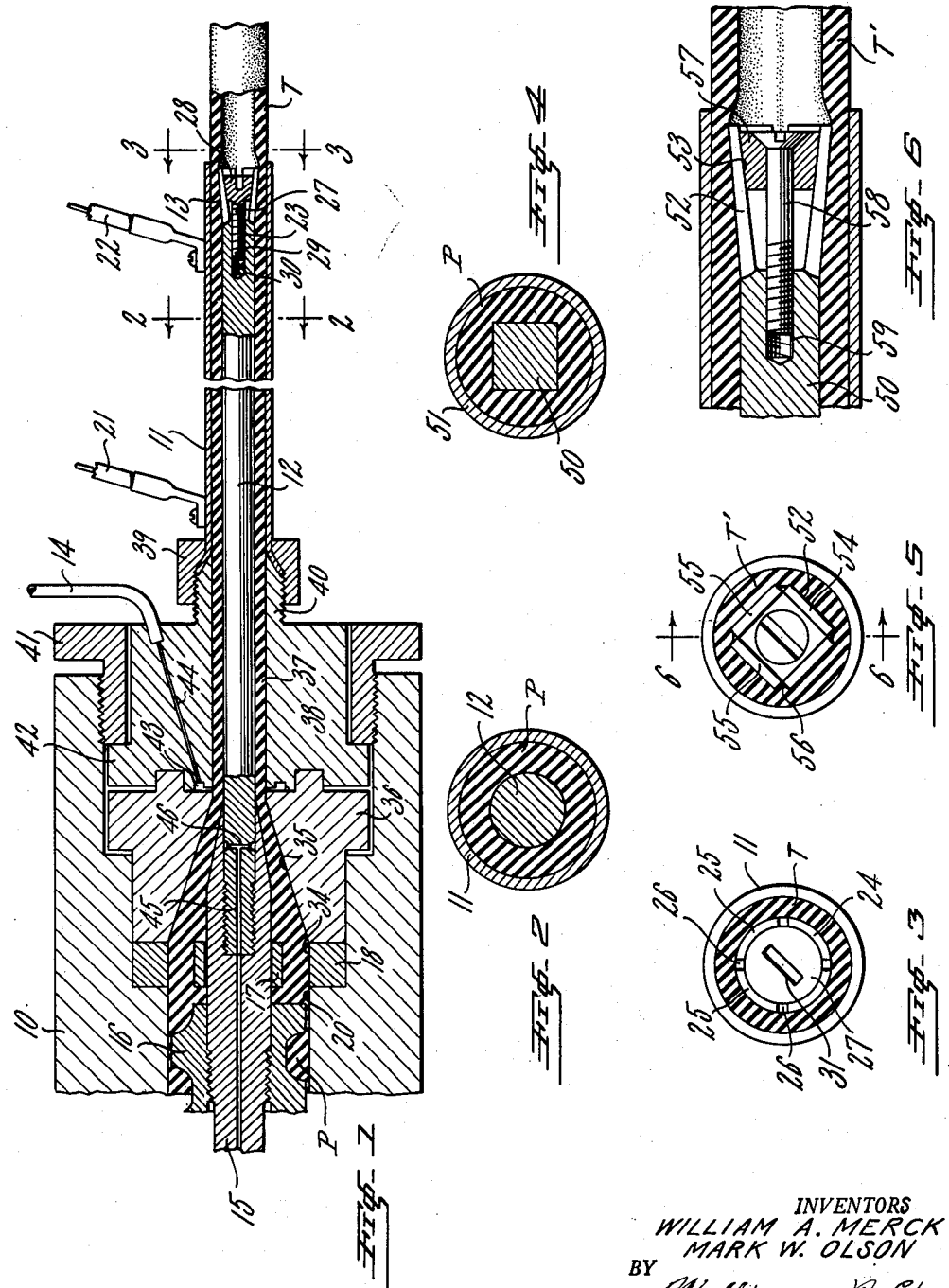
INVENTORS
WILLIAM A. MERCK
MARK W. OLSON
BY William R. Eyer
ATTORNEY

2,616,126

UNITED STATES PATENT OFFICE 2,616,126

PLASTIC TUBE MANUFACTURE

William A. Merck, Rutherford, and Mark W. Olson, Allendale, N. J., assignors to United States Rubber Company, New York, N. Y., a corporation of New Jersey Application June 29, 1950, Serial No. 171,136

2 Claims. (Cl. 18—14)

This invention relates to an improved apparatus for the manufacture of plastic tubes, and it particularly relates to the continuous extrusion and cure of the plastic in tubular form by forcing the plastic through a relatively long sleeve having a long rotatable deflectable core therein which is provided with means for imposing back pressure on the plastic within the sleeve.

In the continuous extrusion and cure of plastic tubes, a relatively long sleeve and core therein is required, in order to permit the plastic to be cured or set while it is confined between the sleeve and the core. The core is supported only at the inlet end of the sleeve, and due to the relatively long suspended length of core, its free deflectable end has sagged away from the center of the sleeve and produced a plastic tube having a bore, or internal cross-sectional dimension which was non-concentric with the walls of the tube, or external cross-sectional dimension thereof. It has been found that the core may be retained in a centered position in respect to the sleeve by rotating either the outer sleeve or the inner core, and thereby cause the deflectable end of the core to float on the plastic in a central position in respect to the walls of the tube being extruded. In either case, it is required that back pressure be applied to the plastic within the tube by constricting the passage between the core and the sleeve near the discharge end thereof. We have found that when the core is rotated and the plastic is rotated with it, improved results are obtained by affixing the restricting means, in the form of a snubber, to the end of the core rather than to the end of the sleeve, thereby eliminating excessive twist of the plastic in the sleeve around the axis of the core. In accordance with our invention an improved expansible snubber is attached to the discharge end of the rotatable mandrel to eliminate such excessive twist.

The foregoing objects and other advantages of this invention will be further described in reference to the accompanying drawings in which:

Fig. 1 is a cross-sectional view of an extruding apparatus provided with a rotatable mandrel and a stationary outer sleeve, and in which the snubber is attached to the floating end of the mandrel at the discharge end of the sleeve in accordance with our invention;

Fig. 2 is a cross-sectional view of the tube forming sleeve and core taken on line 2—2 of Fig. 1;

Fig. 3 is an end view of the sleeve and core looking in the direction of the arrows 3—3 of Fig. 1;

Figs. 4 and 5 are views of a modified form of a core in a sleeve which corresponds to the view in Figs. 2 and 3, respectively, but showing a square core and snubber; and Fig. 6 is a longitudinal cross-section on line 6—6 of Fig. 5.

As shown in Fig. 1 of the drawings, the plastic P is forced by an extruder 10 through a stationary sleeve 11, and around a rotatable core 12 within the sleeve 11 to continuously form and cure or set a plastic tube T, which is being discharged from the sleeve 11. The flow of plastic from the sleeve 11 is restricted by a snubber 13, which is affixed to the core 12 at the discharge end of the sleeve 11 for producing a back pressure on the plastic P in the sleeve, and thereby cause it to completely fill the sleeve and form a tube free from voids. The outer surface of the plastic P in the sleeve 11 is lubricated by lubricant which is forced through a pipe 14, attached to the head of the extruder 10, and the internal surface of the plastic P is lubricated by lubricant which is forced through a conduit 15 in the extruder screw 16. The conduit 15 is threaded into a central bore in the screw 16, whereby it is rotated with the screw. The outer end of the conduit 15 extends through the screw 16, and is provided with a conventional rotary connection (not shown), through which lubricant is supplied to the conduit 15.

The extruder screw 16 is rotated by a conventional drive and forces the plastic P around the core 12 and through the sleeve 11. The core 12 is rotated by the screw 16 through its threaded connection with the lubricant conduit 15, which extends through an opening 17 in the usual spider 18 positioned in the extruder bore 20. The extruder screw 16 rotates in the bore 20 on the center line of the sleeve 11 and it provides the only direct support for the core 12 in the apparatus for maintaining the core centered in sleeve 11. The opposite end of the core 12 is deflectable due to the weight of the relatively long length of the core extending beyond and supported only at one end of the screw 16. Such weight is floated on the plastic P in the sleeve and the center of the core 12 is maintained on the center line of the sleeve 11 by the rotation of the core, which causes the plastic to rotate with it to some extent as it makes contact with the core or the member to which the core is attached, and the plastic tends to approach the speed of rotation of the core as it travels along the core.

As the plastic passes through the sleeve 11, it is set therein, and emerges from the end of the sleeve as a finished tube T. The plastic P, for example may be a vulcanizable rubber compound, and it is vulcanized by means of heat supplied from the electrical resistance of the sleeve 11 to the current which passes between the terminals 21 and 22 which are affixed to the sleeve 11. The rubber compound is progressively vulcanized, and by the time it reaches the snubber 13, it is completely vulcanized.

It will be noted that an aceleration of the rotation of the plastic P on the core 12 takes place while the plastic is being progressively set or vulcanized. The acceleration or deceleration of the rotation of one section of the plastic with respect to the other produces a twist or spiral strains in the walls of the tube being processed. It is desirable that the twist should occur only in the plastic before it has set to a substantial degree in order to prevent permanent strains and fissures from being produced in the tube T. This is accomplished by placing the snubber 13 on the rotating core 12 rather than on the stationary sleeve 11. It was found that such detrimental strains and fissures occured when the snubber was placed on the stationary sleeve 11 and they were eliminated or reduced to a satisfactory degree when the snubber 13 was placed on the rotating core 12. It is believed that the strains or ruptures in the walls of the plastic were produced in the partially set plastic by the stationary snubber, because it stopped or decelerated the rotation of the section of the plastic at the snubber whereas the core 12 continued the rotation of other sections of the plastic in the sleeve 11 and caused a disrupting back twist to be set up in the plastic. Such detrimental effect was eliminated by the rotating snubber 13 because the section of the plastic opposite the snubber was not decelerated with respect to the other sections in the sleeve 11.

As shown in Figs. 1 and 3 the expansible snubber 13 is made by forming a bore 23 in the outer end of the core 12. The wall 24 of the bore is divided into sections 25 by slits 26. The sections 25 are expanded by means of a plug 27 having a tapered head 28 and a threaded end 29, which is screwed into a threaded counterbore 30 in the core 12. A slotted recess 31 is provided in the end of the plug 27, within which a screw driver may be inserted to screw the plug in and out of the counterbore 30 to adjust the constriction between the sleeve 11 and the snubber 13.

The spider 18 is provided with the plurality of openings 34 to permit the plastic P to pass from the bore 20 in the head of the extruder to a tapered passage 35 in a die block 36. The plastic P is discharged from the tapered passage 35 into a passage 37 in a block 38, through which the core 12 passes. The sleeve 11 which receives the plastic P is secured to the block 38 by a flange nut 39, which is screwed on to a threaded nipple 40 on the block 38. The spider 18 and blocks 36 and 38 are secured in the head of the extruder by an assembly nut 41 which is screwed into the bore in the head of the extruder against a flange 42 on the outer block 36, and thereby forces the blocks 36 and 38 towards the spider 18, and holds them securely in place against each other.

A lubricant groove 43 is formed in the face of the block 38, and is connected by a passage 44 to the lubricant pipe 14 for conducting the lubricant to the outer surface of the plastic in the passage 37. The lubricant passes to the inside surface of the plastic P from the conduit 15 into the passage 45 in the core 12. The passage 45 terminates in radial passages 46 which discharge the lubricant into an annular space between the core 12 and the inner end of the conduit 15, through which the lubricant passes to the inner surface of the plastic P along the core 12. The lubricant is supplied to the pipe 14 and the conduit 15 under sufficient pressure to cause it to flow onto the surface of the plastic against the extrusion pressure.

As shown in Figs. 4, 5 and 6 the core 50 in the sleeve 51 may be square, or of a non-circular cross-section for the purpose of making a tube having a like cross-section for its internal bore. In that case, the snubber 52 to be placed on the end of the core should have a like cross-sectional shape as shown in Fig. 5. A recess 53 of a non-circular cross-section is formed in the end of the core 50. As shown in Figs. 5 and 6, the recess is of the square cross-section, and the walls thereof are divided in four sections 55 at the corners by slits 56. The sections 55 are expanded outwardly by a four-cornered pyramidal plug 57, which is forced into the bore 53 by means of a screw 58 which passes through the plug 57 and is threaded into a counterbore 59 in the core 50. The tube T' manufactured by the square core 50 as shown in Figs. 4, 5 and 6 will have a square internal transverse cross-section.

While we have described two forms of this invention, it will be understood that the details may be changed without departing from the spirit of this invention, or the scope of the appended claims.

Having thus described our invention, what we claim and desire to protect by Letters Patent is:

1. An apparatus for extruding and simultaneously setting plastic tubes comprising a relatively long sleeve, a relatively long deflectable core in said sleeve, a support at the inlet end of said sleeve only for maintaining said core centrally of said sleeve, an expansible snubber on the discharge end of said core, means for forcing plastic into said sleeve and around said core, means for lubricating the inner and outer surfaces of said plastic in said sleeve at its inlet end, means for thermosetting said plastic during its passage through said sleeve, and means for rotating said core and said snubber in said sleeve and rotating said plastic by the rotation of said members.

2. An apparatus for extruding and simultaneously vulcanizing tubes of rubber compound comprising a relatively long sleeve, a relatively long deflectable core supported centrally of said sleeve at its inlet end and forming an annular passage between said sleeve and core, means for forcing vulcanizable rubber compound into said sleeve and around said core, means for lubricating the inner and outer surfaces of the rubber compound in said sleeve, means for vulcanizing said rubber compound during its passage through said sleeve, a snubber comprising an enlargement on the discharge end of said core only which reduces the cross section of said passage between said sleeve and core only at the approximate end of said core and only at a point where the rubber compound has been vulcanized, and means for rotating said core and said snubber which cause the rubber compound to rotate therewith.

WILLIAM A. MERCK.
MARK W. OLSON.

REFERENCES CITED

The following references are of record in the file of this patent:

UNITED STATES PATENTS

| Number | Name | Date |
|---|---|---|
| 2,144,213 | Bassett et al. | Jan. 17, 1939 |
| 2,443,289 | Bailey | June 15, 1948 |